(12) United States Patent
Gorenflo (10) Patent No.: US 10,730,156 B2
(45) Date of Patent: Aug. 4, 2020

(54) HANDHELD WORK APPARATUS HAVING A COMBUSTION ENGINE AND AN ELECTRIC START DEVICE

(71) Applicant: Andreas Stihl AG & Co. KG, Waiblingen (DE)

(72) Inventor: Ernst Gorenflo, Heinsheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 140 days.

(21) Appl. No.: 15/884,152

(22) Filed: Jan. 30, 2018

(65) Prior Publication Data

US 2018/0215002 A1 Aug. 2, 2018

(30) Foreign Application Priority Data

Jan. 30, 2017 (EP) ..................................... 17400005

(51) Int. Cl.

| | |
|---|---|
| *B27B 17/08* | (2006.01) |
| *B23Q 5/54* | (2006.01) |
| *F02N 11/08* | (2006.01) |
| *B25F 5/00* | (2006.01) |
| *F02N 11/10* | (2006.01) |

(Continued)

(52) U.S. Cl.
CPC .................. *B23Q 5/54* (2013.01); *B25F 5/00* (2013.01); *F02N 11/08* (2013.01); *F02N 11/0803* (2013.01); *F02N 11/087* (2013.01); *F02N 11/101* (2013.01); *B27B 17/08* (2013.01); *B27B 17/083* (2013.01); *F02B 63/02* (2013.01); *F02D 29/00* (2013.01); *F02D 2400/06* (2013.01); *F02N 11/0814* (2013.01); *F02N 2011/0874* (2013.01); *F02N 2300/2011* (2013.01)

(58) Field of Classification Search
CPC ....... B27B 17/00; B27B 17/083; B27B 17/10; B27B 17/08; B23D 17/00; B23D 57/02; B23D 59/001; F02D 11/04; F02D 41/30; F02D 41/022; F02D 41/1497; F02D 41/062; F02D 41/0097; F02D 31/001; F02D 31/006; B25F 5/00
USPC ...... 173/2, 178, 181, 183, 217, 171; 30/381, 30/382, 383; 83/13, 58, 62.1, 61; 188/77 W
See application file for complete search history.

(56) References Cited

U.S. PATENT DOCUMENTS

| | | | |
|---|---|---|---|
| 4,680,862 A * | 7/1987 | Wieland | B27B 17/08 30/381 |
| 5,813,123 A * | 9/1998 | Wieland | B27B 17/083 188/77 W |

(Continued)

*Primary Examiner* — Scott A Smith
(74) *Attorney, Agent, or Firm* — Walter Ottesen, P.A.

(57) ABSTRACT

A start device is for a chainsaw having a combustion engine. The start device includes an electric motor with a control device, which initiates operation of the electric motor and starts up the combustion engine. The chainsaw has a brake device for bringing the tool to a standstill, wherein the brake device can be operated via an actuation lever. For this purpose, the actuation lever can be moved from a first position (A) into at least one further position (B). The control device is connected to a signal transmitter, which is actuated, and emits a signal to the control device, when the actuation lever is moved from the first position (A) into the further position (B), wherein the signal forms a start signal for initiating operation of the electric motor and for starting up the combustion engine.

12 Claims, 4 Drawing Sheets

(51) Int. Cl.
*F02B 63/02* (2006.01)
*F02D 29/00* (2006.01)

(56) References Cited

U.S. PATENT DOCUMENTS

| | | | | |
|---|---|---|---|---|
| 6,640,444 | B1 * | 11/2003 | Harada | F02B 63/02 |
| | | | | 173/221 |
| 7,331,111 | B2 * | 2/2008 | Myers | B27B 17/083 |
| | | | | 188/77 W |
| 8,469,001 | B2 * | 6/2013 | Yoshizaki | F02D 11/04 |
| | | | | 123/198 DC |
| 8,661,951 | B2 | 3/2014 | Gorenflo | |
| 8,833,221 | B2 | 9/2014 | Tomita et al. | |
| 9,005,083 | B2 | 4/2015 | Karrar | |
| 9,759,176 | B2 * | 9/2017 | Mezaki | B27B 17/083 |
| 10,436,135 | B2 * | 10/2019 | Larsson | F02D 31/006 |
| 2006/0293150 | A1 * | 12/2006 | Baur | B60W 10/06 |
| | | | | 477/203 |
| 2010/0064532 | A1 * | 3/2010 | Wittke | B27G 19/003 |
| | | | | 30/382 |
| 2010/0257743 | A1 * | 10/2010 | George | B27B 17/083 |
| | | | | 30/383 |
| 2011/0146610 | A1 | 6/2011 | Reichler et al. | |
| 2012/0193112 | A1 * | 8/2012 | Gwosdz | F02D 31/009 |
| | | | | 173/1 |
| 2013/0111865 | A1 | 5/2013 | Hansen et al. | |
| 2015/0174751 | A1 * | 6/2015 | Gorenflo | B25F 5/00 |
| | | | | 173/1 |

\* cited by examiner

HANDHELD WORK APPARATUS HAVING A COMBUSTION ENGINE AND AN ELECTRIC START DEVICE

CROSS REFERENCE TO RELATED APPLICATION

This application claims priority of European patent application no. 17 400 005.9, filed Jan. 30, 2017 the entire content of which is incorporated herein by reference.

FIELD OF THE INVENTION

The invention relates to a portable handheld work apparatus having a combustion engine and an electric start device for starting up the combustion engine. The start device has an electric motor forming a starter motor and includes a control device, via which the operation of the electric motor is initiated in order to start up the combustion engine when predetermined conditions for starting the combustion engine have been met. For the purpose of starting up the combustion engine, provision is made to enable a brake device for bringing the tool to a standstill, wherein the brake device can be operated via an actuation lever. For the purpose of activating or deactivating the brake device, the actuation lever can be moved from a first position, for example, a starting position, into at least one further position.

BACKGROUND OF THE INVENTION

The preconditions for starting up the combustion engine electrically require given starting criteria, as a result of which, during practical operation, the advantage of starting the combustion engine electrically is often compromised.

SUMMARY OF THE INVENTION

It is an object of the invention to provide a handheld work apparatus having a combustion engine and an electric start device for the combustion engine such that the user can safely start up the combustion engine repeatedly via the start device by performing just a small number of actions.

The object can, for example, be achieved in that the actuation lever, as a result of being moved from the first position into at least one further position, actuates a signal transmitter, and the latter emits a signal to the control device. In dependence on the signal from the signal transmitter, the control device will generate a start signal for initiating operation of the electric motor and for starting up the combustion engine when the predetermined further position has been detected.

For the purpose of initiating operation of the combustion engine, it is usually the case that first of all the brake device has to be enabled in order to bring the tool to a standstill. The user will therefore—in keeping with safe operation—actuate the actuation lever of the brake device in order to create safe preconditions for the combustion engine to be started up. According to an aspect of the invention, then, provision is made for the actuation lever to have arranged on it a signal transmitter, which senses the pivoting position of the actuation lever and signals this to the control device. The control device can thus detect whether the actuation lever has been pivoted from its first position into a further position. A control device can determine therefrom whether it is safe to start the combustion engine. If a first position for starting up the combustion engine is detected, the control device closes a starter switch in order to initiate operation of the electric motor for the purpose of starting the combustion engine. Without performing any further or additional actions, the user can safely start up the combustion engine and initiate operation of the work apparatus. The start device according to an aspect of the invention is preferably provided for safely restarting the combustion engine and is expediently configured for this purpose.

Restarting means that the combustion engine is started anew within a short amount of time after being switched off, for example within a time period of 30 seconds. For a restart, it is necessary for the engine already to have been started up successfully; such a successful start up can be correspondingly stored on an interim basis in the control device. Restarting preferably takes place when the engine is warm. In order for this to be established, an operating period of the engine, or the temperature, can be sensed, to provide information, by a thermocouple in a control unit.

In an embodiment of the invention, the further position corresponds to a first or second intermediate position of the actuation lever, in which the actuation lever has been deflected through a predetermined positioning path from the first position, preferably a starting position. For this purpose, the signal transmitter may be configured in the form of an angle-of-rotation transmitter, and therefore the control device can detect the position of the actuation lever at any point in time with reference to the angle of rotation of the same, in order to establish whether a start signal to the electric motor, forming a starter motor, is admissible or not.

It is expediently possible for the further position to correspond to a first or second end position of the actuation lever, in which the actuation lever has been deflected through a maximum positioning path from the first position. It may be advantageous to assign a positioning sensor to the first or second end position. The configuration may be such that the positioning sensor responds, and emits a signal to the control device, when the actuation lever butts against an end stop in the first or second end position.

It may be advantageous to configure the signal transmitter in the form of an angle-of-rotation transmitter which emits to the control device a signal which is proportional to the angle of rotation of the actuation lever. The signal transmitter is expediently configured in the form of an end-signal transmitter, that is, the signal transmitter emits a signal to the control device at the end of the positioning path. The signal transmitter may also be configured in the form of a combination of an angle-of-rotation transmitter and end-signal transmitter.

It is advantageous for the brake device to be in the released state in the first intermediate position of the actuation lever. It may also be expedient for the brake device to be enabled in the second intermediate position of the actuation lever. With the brake device enabled, it may be expedient for restarting of the combustion engine also to be triggered by virtue of a throttle lever lock being activated or pushed down. Restarting of the combustion engine can also be triggered by virtue of the throttle lever being pushed down, preferably only once the throttle lever lock has been actuated.

If the control device establishes a predetermined signal from the signal transmitter, the control device initiates operation of the electric motor in order to start up the combustion engine in particular only when, in addition to the predetermined signal from the signal transmitter, a predetermined operating state of the work apparatus has been detected.

The electric motor is preferably supplied with power from a battery, for example from a lithium-ion battery. The battery or batteries can be fixed in place in the handheld work apparatus. Provision is advantageously made for the batteries to be charged by a generator during operation of the combustion engine.

A predetermined operating state is expediently a successful, completed first start up of the combustion engine, for example, a manual start up of the combustion engine using a pull rope starter. As an alternative, the combustion engine can also be started up electrically by a start button or via an ignition key. The predetermined operating state may also consist in idling operation of the combustion engine having been established for a predetermined period of time. It may also be expedient for the operating state to be established as a result of the user holding the associated handles in both hands. Such a "two-hand safety control" can be formed straightforwardly by sensors, switches or the like provided on the handles.

In an embodiment of the invention, an electronically locked locking device is activated by the signal from the signal transmitter.

The combustion engine can advantageously be started up when a throttle lever lock assigned to a throttle lever of the combustion engine is depressed by the user and the actuation lever is pivoted into a further position, for example, by being nudged by the user. The user's hand on the throttle lever lock and the other hand of the user being used for activating the actuation lever constitute, in the broader sense, a two-hand safety control. The combustion engine can be started up only when both the user's hands are detected at predetermined locations of the work apparatus. Only then will the control device initiate operation of the electric motor in order to start up the combustion engine.

The combustion engine can advantageously be started up when a throttle lever of the combustion engine is depressed and the actuation lever is adjusted into a further position. The control device will then initiate operation of the electric motor in order to start up the combustion engine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
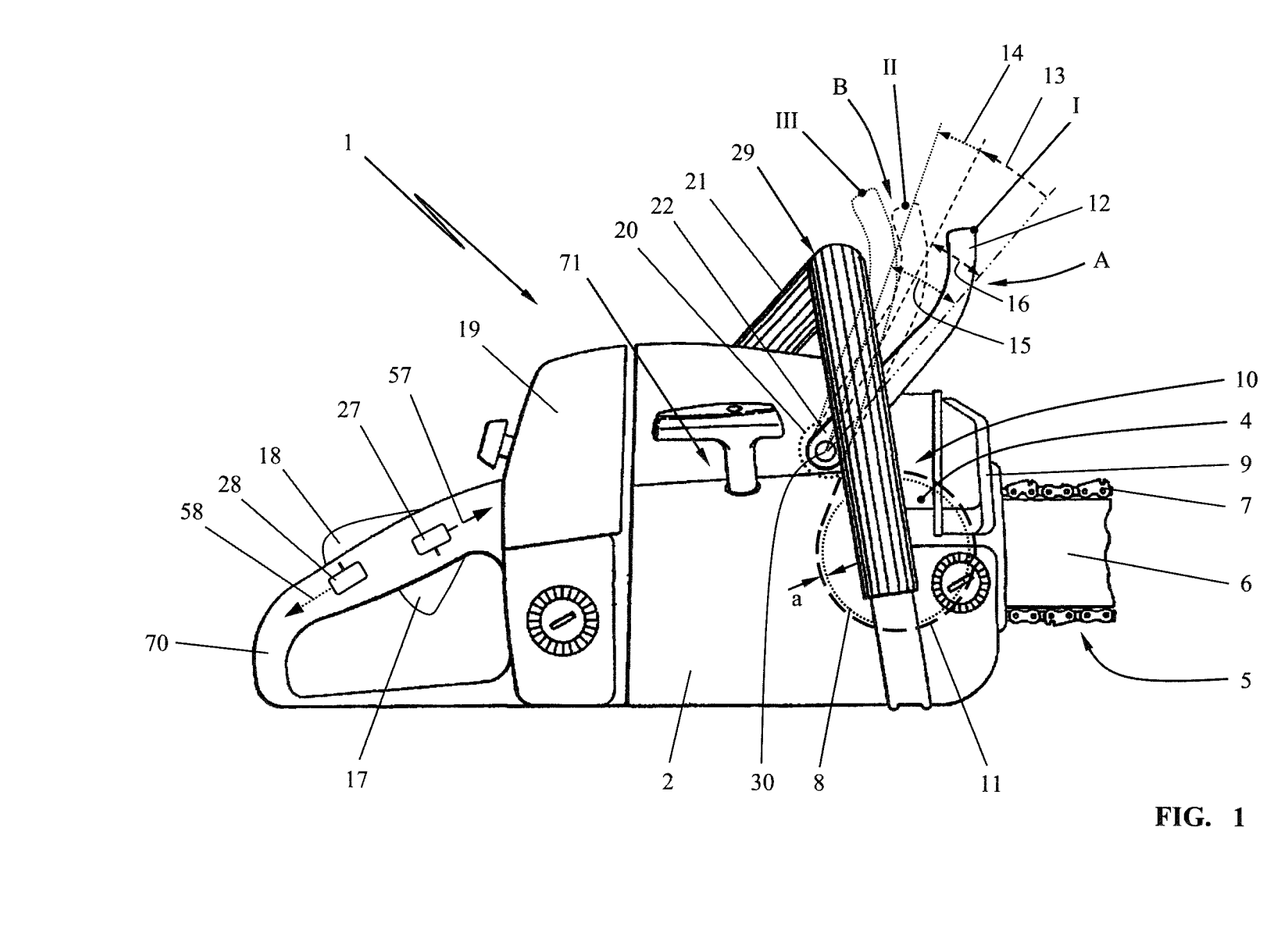
FIG. 1 shows a schematic illustration of a work apparatus using the example of a chainsaw having a combustion engine and a hand guard forming an actuation lever for a brake device for bringing a tool to a standstill.

The work apparatus may be a portable work apparatus such as a chainsaw, a hedge trimmer, a brushcutter or similar work apparatus. In FIG. 1, the work apparatus illustrated is a chainsaw 1 with a basic construction which is known per se. The housing 2 of the chainsaw 1 contains a combustion engine 3 (FIG. 2), which drives a tool 5 via a clutch 4. In the embodiment shown, the tool 5 is a saw chain 7 which circulates on a guide bar 6. The clutch 4 is preferably a centrifugal clutch with a clutch drum 8, which drives the tool 5 via a drive wheel connected in a rotationally fixed manner to the clutch drum 8.

The work apparatus has a brake device 10, which in the embodiment shown acts on the clutch drum 8. As shown in FIG. 1, the clutch drum 8 has a brake band 11 wrapped around it. If the brake band 11 is placed in position on the clutch drum 8, the latter comes to a standstill in fractions of a second; since the drive wheel of the tool 5 is connected in a rotationally fixed manner to the clutch drum 8, the drive wheel—together with the tool 5—is braked to a standstill in fractions of a second. When the brake device 10 is active, the brake band 11 butts against the clutch drum 8. An active brake device 10 prevents the tool 5 from being driven.

In the released position of the brake device 10 illustrated in FIG. 1, the brake band 11 is located at a small distance a from the circumferential wall of the clutch drum 8; in this released position according to FIG. 1, the clutch drum 8 can rotate freely and drive the tool 5. The brake device 10 is not active.

Figure 2:
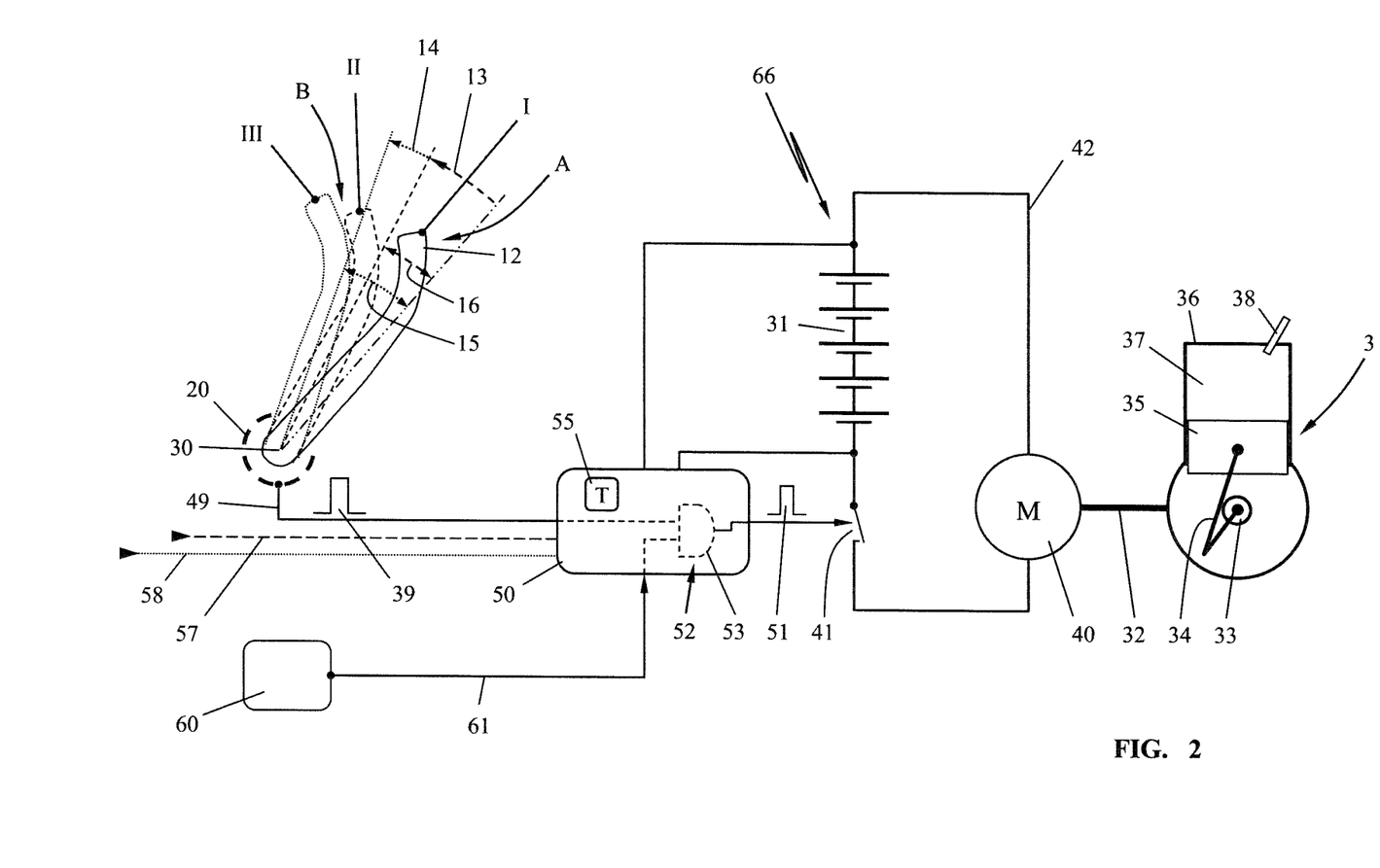
FIG. 2 shows a schematic illustration of a basic circuit diagram for starting up the combustion engine, using an electric motor in the form of a starter motor, by virtue of the actuation lever of the brake device being pivoted in the counterclockwise direction.

The front end of the housing 2 has the guide bar 6 with the tool 5. Provided at the other, rear end of the housing 2 is a rear handle 70 with operating elements for controlling the combustion engine 3 (FIG. 2). A first operating element is formed by a throttle lever 17, which is assigned a second operating element in the form of a throttle lever lock 18.

The rear handle 70 is located at the rear end of the housing 2, in a state in which it is aligned essentially in the longitudinal direction of the chainsaw 1. An air filter 19 for filtering the combustion air for the combustion engine 3, which is arranged in the housing 2, is arranged in the region of the rear handle 70 of the housing 2.

The chainsaw 1 also has a front handle 29, which is formed by a bale handle. The bale handle spans the front section of the housing 2. The bale handle has a lateral handle section and an upper handle section 21, which spans the housing. Provided between the upper handle section 21 of the bale handle 29 and a muffler 9 at the front end of the housing 2 is an actuation lever 12, via which the brake device 10 can be actuated. In the case of a chainsaw 1 according to the embodiment according to FIG. 1, the actuation lever 12 forms a trigger for the brake device 10 and serves as a hand guard, which is provided in front of the upper handle section 21 of the front handle 29.

FIGS. 1 and 2 represent the first position A of the actuation lever 12 using a solid line. The first position A corresponds to a starting position I of the actuation lever 12. In the first position A of the actuation lever 12, the brake device 10 may be active or also inactive.

FIGS. 1 and 2 illustrate the brake device 10 as being inactive, that is, the brake band 11 is located at a distance a from the clutch drum 8. The actuation lever 12 is located in a first position A. In order to start up the combustion engine 3, the actuation lever 12 is moved from the first position A, in the direction of the arrow 13, toward the upper handle section 21 of the bale handle 29, wherein the actuation lever 12 pivots in the counterclockwise direction about a pivot axis 30 and assumes a further position B.

The further position B of the actuation lever 12 may be both a first intermediate position II of the actuation lever 12 and a first end position III of the actuation lever 12.

After travelling over a pivot path 16 from the first position A, the first intermediate position II is reached in the first instance, the intermediate position being illustrated by a dashed line in FIGS. 1 and 2. If the actuation lever 12 is pivoted onward in arrow direction 14, beyond the dashed-line, first intermediate position II, toward the bale handle 29, it passes, after travelling over a pivot path 15, into the first end position III (illustrated by a dotted line). Over its pivot path 15 from the first position A into the first end position III, the actuation lever 12 passes through the first intermediate position II.

In the illustration according to FIG. 1, it is also possible for the brake device 10 to be active, in which case the brake band 11 butts against the clutch drum 8. If the brake device 10 is active, the actuation lever 12 is pivoted from its first position A in the direction of the upper handle section 21 of the front bale handle 29, or in the direction of the air filter 19, in order to release the brake device 10. The configuration may be such that the brake device 10 is released as the actuation lever 12 reaches the first intermediate position II. Following release of the brake device 10, the user can let go of the actuation lever 12; the latter is returned automatically—preferably by spring force—into the first position A counter to arrow direction 13. If, in contrast, the actuation lever 12 is pivoted onward in arrow direction 14, the first end position III of the actuation lever 12 is reached. The actuation lever 12 can thus be pivoted from a first position A into a further position B (first intermediate position II or first end position III).

The actuation lever 12 is assigned a signal transmitter 20 (FIGS. 1 and 2). The signal transmitter 20 senses the movement of the actuation lever 12. The signal transmitter 20 is advantageously arranged at the lower end 22 of the actuation lever 12. The signal transmitter 20 is provided, in particular, in the region of the pivot axis 30. The signal transmitter 20 advantageously senses the rotary movement of the actuation lever 12 about the pivot axis 30. The signal transmitter 20 advantageously senses the direction of the rotary movement and/or the angle of rotation of the rotary movement. The signal transmitter 20 is expediently configured in the form of an angle-of-rotation transmitter which emits to a control device 50 (FIG. 2) a signal 39 which is proportional to the angle of rotation of the actuation lever 12. It is also possible for the signal transmitter 20 to be configured in the form of an end-signal transmitter, that is, the signal transmitter 20 emits a signal at the end of the positioning path 15. The signal transmitter 20 may also be configured in the form of a combination of an angle-of-rotation transmitter and end-signal transmitter.

The signal transmitter 20 is advantageously a contactless signal transmitter or is configured in the form of an electromechanical switching device, for example, in the form of a limit switch.

As FIG. 1 also shows, the throttle lever lock 18 is a position sensor 28 and the throttle lever 17 is assigned a further position sensor 27. The signal lines 57, 58 of the position sensors 27, 28 are expediently connected to the control device 50 (FIG. 2). The control device 50 is configured in order to evaluate the output signals from the position sensors 27, 28.

As represented in FIG. 2, the start device 66 is configured in order to start up the combustion engine 3 (FIG. 2), which is arranged in the housing 2, via an electric motor 40 in the form of an electric starter, where the electric motor 40 should be connected to an electric power source. The power source is preferably formed by a battery pack 31. The electric motor 40 is actuated by a start switch 41, which is provided in the circuit 42 of the electric motor 40 and opens or closes the circuit 42.

As FIG. 2 represents schematically, the electric motor 40 is connected to the crankshaft 33 of the combustion engine 3 via a mechanical drive connection 32. The upward and downward movement of a piston 35, which is guided in a cylinder 36, is transmitted to the crankshaft 33 via a connecting rod 34. The combustion chamber 37, which is formed in the cylinder 36, is assigned a spark plug 38 which, during operation, ignites a fuel/air mixture taken into the combustion chamber 37 and drives the piston 35 so as to drive the crankshaft 33. The combustion engine 3 is preferably a two-stroke engine, in particular a stratified scavenging engine, a mixed-lubrication four-stroke engine or similar combustion engine.

The output signal from the signal transmitter 20, which is arranged on the actuation lever 12, is advantageously fed to the control device 50 via a signal line 49, the output signal thereof forming a start signal 51 to control the start switch 41.

According to an aspect of the invention, in FIG. 1, a movement of the actuation lever 12 from a first position A into a further position B is detected via the signal transmitter 20. This further position B may be the first intermediate position II or the first end position III. The signal transmitter 20 emits to the control device 50 a signal 39 which corresponds to the further position B of the actuation lever 12. The control device 50 evaluates the signal 39 from the signal transmitter 20 in order to detect the current further position B of the actuation lever 12. If a user has pivoted the actuation lever 12 from the first position A into a further position B (first intermediate position II or first end position III), the control device 50 detects the further position B of the actuation lever 12. If a predetermined further position B has been detected, the control device 50 generates a start signal 51 in order to initiate operation of the electric motor 40 and to start up the combustion engine 3.

The control device 50 is advantageously configured such that it is not just the signal 39 from the signal transmitter 20 which is utilized for initiating operation of the electric motor 40 and for starting up the combustion engine 3; in addition, a predetermined operating state of the work apparatus can be taken into account, the predetermined operating state being established, for example, via a sensing device 60 and being communicated to the control device 50 via a signal line 61. Such a predetermined operating state of the work apparatus may be, for example, an established operating state of the combustion engine 3. Such an operating state may be a successful, completed first start up of the combustion engine 3. A successful start up of the combustion engine would be established, for example, by the combustion engine remaining for a predetermined amount of time for example in idling operation. A timer may be expedient for this purpose.

If the sensing device 60 establishes a predetermined operating state of the work apparatus or of the combustion engine 3, the sensing device 60 emits a corresponding signal to the control device 50 via the signal line 61. The electric motor 40 for starting up the combustion engine 3, however, is in particular only enabled when a signal 39 from the signal transmitter 20 additionally indicates one of the further positions B of the actuation lever 12. It is expedient, for this purpose, to provide an electronically locked locking device 52, which may be configured, for example, in the form of a logic AND element 53. A start signal 51 is emitted only when a predetermined signal 39 from the signal transmitter 20 and, at the same time, a signal from the sensing device 60 indicating a predetermined operating state are present at the inputs of the AND element 53.

Alongside the signal 39 from the signal transmitter 20 and the additional signal from the sensing device 60, it is also possible, in order to enable start up of the combustion engine 3, to sense the positions of the throttle lever lock 18 via the position sensor 28 and the position of the throttle lever 17 via the position sensor 27. Alternative influencing signals and operating states may also be constituted by the filling level of the tank or similar influencing factors.

In order for the combustion engine 3 to be started up, provision may be made for the control device 50 to give a start signal 51 to the start switch 41 only when, for example, the throttle lever lock 18 has been depressed. This is interrogated via the position sensor 28, which is assigned to the throttle lever lock 18 and of which the output signal is indicated to the control device 50 via a signal line 58. The signal from the position sensor 28 of the throttle lever lock 18 can be advantageously linked to the signal 39 from the signal transmitter 20 of the actuation lever 12 such that the combustion engine 3 can be started up electrically only when the throttle lever lock 18 has been depressed, and it is thus ensured that the user's hand is present on the rear handle 70.

As an alternative, or in addition, it is also possible to provide the position sensor 27 on the throttle lever 17, the signal thereof being fed to the control device 50 via the signal line 57. It would thus be possible for the combustion engine 3 to be started up electrically only when the position sensor 27 of the throttle lever 17 signals that the throttle lever 17 is in the idling position.

The combustion engine 3 can advantageously be started up only when a throttle lever lock 18, which is assigned to the throttle lever 17 of the combustion engine 3, has been depressed by the user and the actuation lever 12 has been depressed into a further position B by the user, for example, the actuation lever forming an activating button which is nudged by the user. Restarting is advantageously permitted only when the user has performed both actions in particular within a predetermined amount of time or a predetermined time frame. The user's hand on the throttle lever lock 18 and the other hand of the user being used for activating the actuation lever 12 constitute, in the broader sense, a two-hand safety control. The combustion engine 3 can be started up only when both the user's hands are detected at predetermined locations of the work apparatus. Only then will the control device 50 initiate operation of the electric motor 40 in order to start up the combustion engine 3.

Restarting of the combustion engine 3 can also be triggered when the throttle lever 17 of the combustion engine 3 has been depressed by the user and the actuation lever 12 is moved into a further position B by the user, for example, the actuation lever forming an activating button which is nudged by the user. Restarting is advantageously permitted only when the user has performed both actions, in particular, within a predetermined amount of time or a predetermined time frame. The user's hand on the throttle lever 17 and the other hand of the user being used for activating the actuation lever 12 constitute, in the broader sense, a two-hand safety control. The combustion engine 3 can be started up only when both the user's hands are detected at predetermined locations of the work apparatus. Only then will the control device 50 initiate operation of the electric motor 40 in order to start up the combustion engine 3.

A further configuration of the invention provides the sensing device 60 in order to start up the combustion engine 3 electrically when, and only when, the combustion engine 3 is restarted. This means that the combustion engine 3, when first started up, is started up by hand in the first instance via the pull rope starter 71 (FIG. 1) and the control device 50 takes effect when, and only when, the combustion engine 3 is restarted. The first start up and/or restarting can also advantageously take place via a start button or an ignition key. It may be expedient to limit the option of restarting via the electric start device 66 to a time period after the combustion engine has been turned off; such a time period could be, for example, three minutes or five minutes. A timer 55 which monitors this time period could expediently be integrated in the control device 50.

Figure 3:
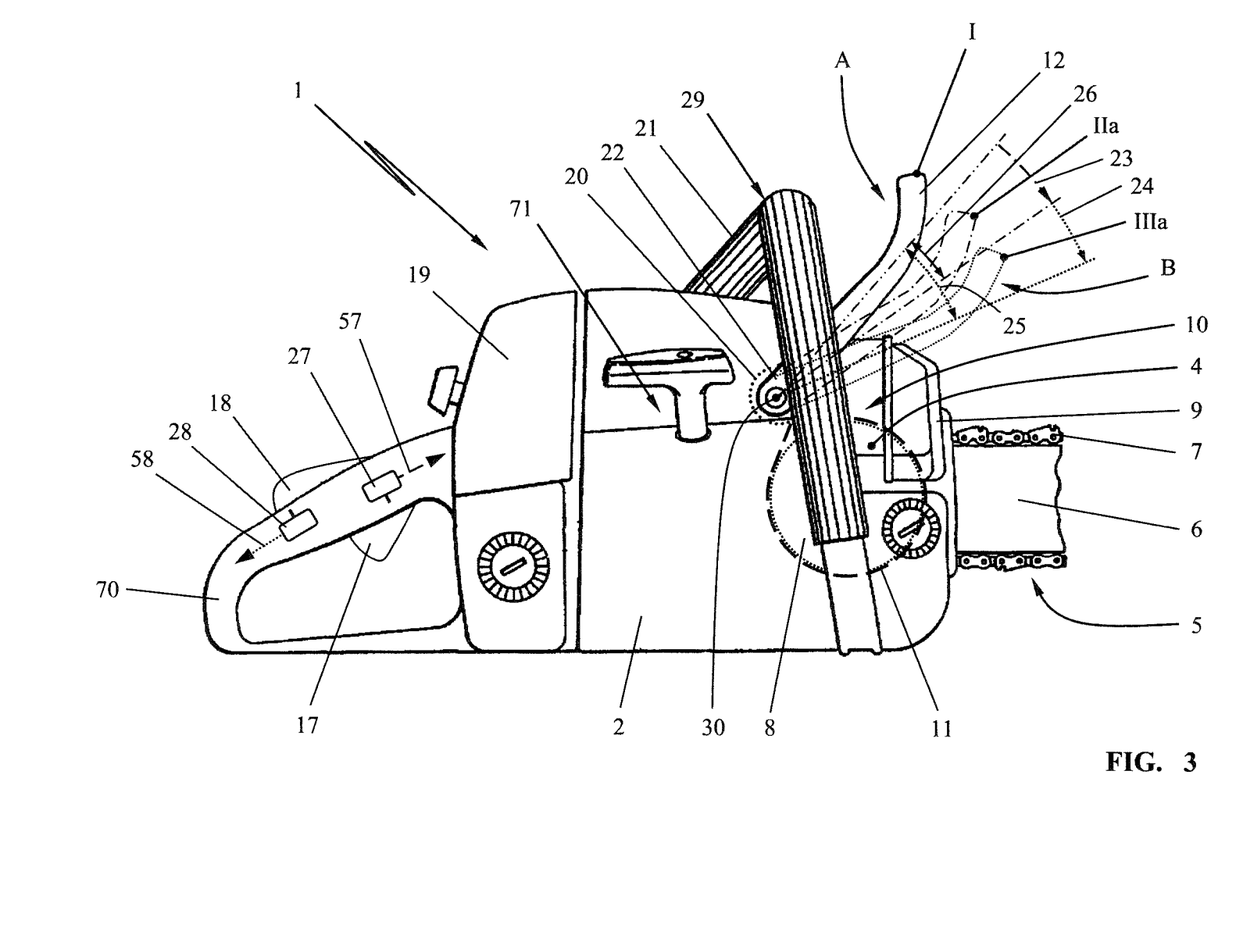
FIG. 3 shows a schematic illustration of a work apparatus corresponding to FIG. 1 having a brake-device actuation lever which can be pivoted in the clockwise direction in order to start up the combustion engine; and, FIG. 4 shows a schematic illustration of an extended basic circuit diagram for starting up the combustion engine, using an electric motor, by virtue of the actuation lever of the brake device being pivoted in the clockwise or counterclockwise direction.

The embodiment according to FIG. 3 corresponds, in respect of basic construction, to the embodiment according to FIG. 1, for which reason like reference signs are used for like parts.

If, in FIG. 3, the actuation lever 12 is pivoted in arrow direction 23 towards the muffler 9, then, during travel over a pivot path 26 about the pivot axis 30, the prestressed brake device 10 can be triggered when the second intermediate position IIa (illustrated by a chain-dotted line) is reached. Beyond the second intermediate position IIa, the actuation lever 12 can be pivoted toward the muffler 9, in arrow direction 24, into a second end position IIIa (illustrated by a dotted line). As it travels from the first position A into the second end position IIIa, the actuation lever travels over a pivot path 25.

In order to trigger the stressed-state brake device 10, the actuation lever 12 thus has to be moved in the clockwise direction, toward the exhaust muffler 9, about the pivot axis 30. The pivoting transfers the actuation lever 12 from a first position A into a further position B. Corresponding to the embodiment according to FIG. 1, the actuation lever 12 can be pivoted from the first position A, via a second intermediate position IIa, into a second end position IIIa (further positions B). In FIG. 3, the brake band 11 is illustrated in the braking position, in abutment against the clutch drum 8; the brake device 10 is active.

The sensor 20, which is arranged at the end 22 of the actuation lever 12, also detects these pivoting movements. If the actuation lever 12 is pivoted from the first position A, over the positioning path 26, in arrow direction 23, the second intermediate position IIa is reached. If the actuation lever 12 is pivoted all the way over positioning path 25 in arrow direction 24, the second end position IIIa is reached. The signal transmitter 20 can emit to the control device 50, via the signal line (FIG. 4), an output signal which is proportional to the positioning path 25 or 26, and it is therefore possible for the second intermediate position IIa and likewise the second end position IIIa to be detected.

Figure 4:
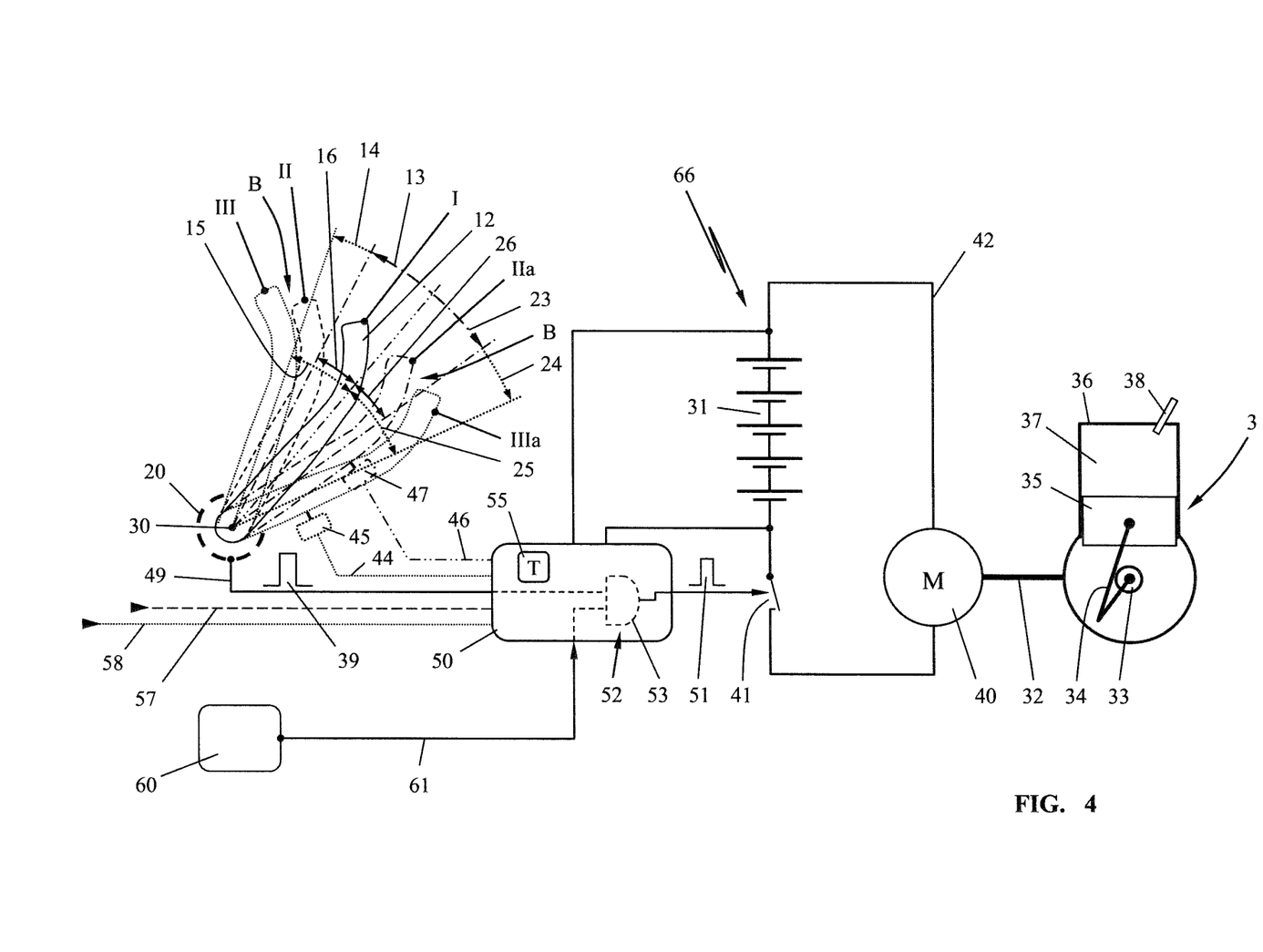

FIG. 4 represents a basic circuit diagram for starting up the combustion engine 3 in an illustration according to FIG. 2. Like parts are provided with like reference signs; functioning is also the same.

FIG. 4 represents the further positions B of the actuation lever 12 during a pivoting movement in the counterclockwise direction—first intermediate position I, first end position II—and during a pivoting movement in the clockwise direction—second intermediate position IIa, second end position IIIa. The signal transmitter 20 advantageously emits a negative or positive output signal in dependence on the rotary movement in the clockwise or counterclockwise direction. The control device 50 can thus evaluate the magnitude and the sign of the signal 39 and therefore detect the further positions B, namely the first intermediate position I, the first end position II, the second intermediate position IIa and the second end position IIIa of the actuation lever 12. If the signal 39 of the signal transmitter 20 is, for example, positive, the pivoting movement is taking place in arrow direction 13 or 14. If the signal 39 of the signal transmitter 20 is, for example, negative, the pivoting movement is taking place in arrow direction 23 or 24. The intermediate position and the end position can be detected in dependence on the magnitude of the signal 39.

A position sensor may be provided in order to detect a further position. As FIG. 4 shows, a position sensor 45 is arranged in order to detect the second end position IIIa of the actuation lever 12. Correspondingly, a position sensor 47 may be arranged in order to detect the second intermediate position IIa. Each position sensor 45, 47 is connected to the control device 50 of the start device 66 via a signal line 44, 46, the control device evaluating the output signals from the position sensors 45, 47.

The end positions III and IIIa are advantageously activating points. If the actuation lever 12 is pivoted into one of the end positions III and IIIa, it returns automatically into the first position A. The return movement advantageously takes place by way of a restoring spring acting on the actuation lever 12.

The first position A can correspond to a starting position I of the actuation lever 12. This starting position I of the actuation lever 12 may also be referred to as a rest position, into which the actuation lever 12 pivots back automatically, following deflection of the actuation lever 12 by the user, if it is no longer subjected to any force. This starting position I of the actuation lever 12 may be positioned differently when the brake device 10 is triggered than in the standby position of the brake device 10, in which the brake device 10 is in a stressed state. The actual angular positioning of the actuation lever 12 in the starting position I is irrelevant for functioning purposes. Reference is therefore made to the umbrella term first position A.

The start device according to an aspect of the invention for a first start up, or restarting, of a combustion engine 3 can operate, by way of example, in accordance with the following criteria:

1. The brake device 10 is enabled; the brake band 11 butts against the clutch drum 8. The tool 5 is at a standstill. The actuation lever 12 is located in the first position A.
    a) For the purpose of starting up the combustion engine 3, the actuation lever 12 is pivoted via the second intermediate position IIa (released position of the brake device 10) in the direction of the second end position IIIa, in arrow direction 23, toward the muffler 9. It is preferably the case that, when the second intermediate position IIa is passed, in particular when the end position IIIa is reached, the signal 39 from the signal transmitter 20 which is then present will cause the control device 50 to close the start switch 41 and initiate operation of the electric motor 40 in order to start the combustion engine 3.
        Since, during a pivoting movement of the actuation lever 12 in the clockwise direction toward the muffler 9, the brake device 10 is triggered and the band brake 11 is placed in position, it is necessary, in order to start work with the work apparatus, first of all for the actuation lever 12 to be pivoted, for the purpose of releasing the brake device 10, in the direction of the upper handle section 21, or in the direction of the air filter 19, into at least the first intermediate position II.
        Provision may expediently be made for it to be necessary for the actuation lever 12 to be retained in the second end position IIIa for a predetermined period of time, so that a clear start signal is given by the user. Without the actuation lever 12 being retained, the actuation lever 12 pivots back into the first position A. It is particularly preferable for yet other signals, for example relating to an actuated throttle lever lock 18 and/or an actuated throttle lever 17, to be interrogated by the control device 50 prior to start up.
    b) For the purpose of restarting the combustion engine 3, with the brake device 10 enabled, the actuation lever 12 is pivoted in the direction of the upper handle section 21, or in the direction of the air filter 19, into the first intermediate position II. If the brake device 10 was active, the pivoting movement of the actuation lever 12 releases the brake device 10. With the brake device 10 released, the brake band 11 is located at a distance a from the clutch drum 8. The control device 50 detects onward pivoting beyond the first intermediate position II, in the direction of the first end position III, to be a start-up request. The control device 50 will initiate operation of the electric motor 40 by closure of the start switch 41, in order to start up the combustion engine 3. Start up preferably takes place only when the actuation lever 12 butts against an end stop in the first end position III. It is particularly preferable for start up to take place only when the actuation lever 12 is retained in the first end position III over a predetermined period of time of, for example, four seconds. It may be expedient to provide an end stop for the actuation lever 12 and for the stopping action against the end stop to be sensed.
2. The brake device 10 has been released; the brake band 11 is located at a distance a from the clutch drum 8. The actuation lever 12 is located in a first position A.
    a) By virtue of the actuation lever 12 being moved in the direction of the muffler 9, the brake device 10 is enabled when the second intermediate position IIa is reached. This means that the brake band 11 is moved from a released state into a state in which it is placed in position on the clutch drum 8. By virtue of the actuation lever 12 being pivoted onward in the direction of the second end position IIIa, evaluation of the signal 39 from the signal transmitter 20 causes the control device 50 to close the start switch 41 and initiate operation of the electric motor 40 in order to start up the combustion engine 3. The control device 50 will preferably close the start switch when the actuation lever 12 is retained in the second end position IIIa over a predetermined period of time of, for example, four seconds. It may be expedient to provide an end stop for the actuation lever 12 and for the stopping action against the end stop to be sensed.
        In order for the work apparatus to be operated, the actuation lever 12 is then pivoted, in the direction of the air filter 19, at least into the second intermediate position II, as a result of which the brake device 10 is released.
    b) It is also possible, if required, for the combustion engine 3 to be started up without the brake device 10 being enabled, if the actuation lever 12 is pivoted in the direction of the bale handle 29, or in the direction of the air filter 19, into the first intermediate position II. It may also be advantageous for the combustion engine to be restarted, by virtue of the electric motor 40 being switched on, only when the actuation lever 12 is located in the first end position III, in the vicinity of the bale handle 29.

c) It is also advantageously possible for the control device 50 to initiate operation of the electric motor 40, in order to start up the combustion engine 3, when—with the brake device 10 open, that is, released—the user moves the actuation lever 12 by activating or pivoting it in the direction of the muffler 9. The combustion engine 3 can advantageously be started up only when the throttle lever lock 18 and/or the throttle lever 17 have/has been depressed.

As an alternative, provision may be made for start up of the combustion engine 3 to be triggered just by the throttle lever lock 18 and/or the throttle lever 17 being pushed down.

In particular, it may be advantageous, for the restarting function, to provide a timer, which can be integrated in the control device 50. Via the timer, it is possible to link in the condition that it is necessary for the throttle lever 17 and/or the throttle lever lock 18 to be depressed for a predetermined period of time.

It is understood that the foregoing description is that of the preferred embodiments of the invention and that various changes and modifications may be made thereto without departing from the spirit and scope of the invention as defined in the appended claims.

What is claimed is:

1. A portable, handheld work apparatus comprising:
a combustion engine configured to drive a work tool;
an electric start device configured to start said combustion engine;
said electric start device including an electric motor having a control device;
said control device being configured to initiate operation of said electric motor and start said combustion engine;
a brake arrangement configured to bring said work tool to a standstill;
an actuation lever;
said brake arrangement being configured to be operated via said actuation lever;
said brake arrangement being configured to move from a first position (A) to a further position (B);
a signal transmitter configured to output a signal to said control device;
said actuation lever being configured to actuate said signal transmitter as a result of being moved from said first position (A) to said further position (B); and,
said signal being configured to generate a start signal for initiating operation of said electric motor and to start said combustion engine when said further position (B) is detected.

2. The work apparatus of claim 1, wherein said further position (B) corresponds to a first intermediate position (II) or a second intermediate position (IIa) of said actuation lever, in which said actuation lever is displaced from said first position (A) by a predetermined positioning path.

3. The work apparatus of claim 2, wherein:
said positioning path has a positioning path end; and,
said signal transmitter is configured to output said signal at said positioning path end.

4. The work apparatus of claim 2, wherein said brake arrangement is released when said actuation lever is in said first intermediate position (II).

5. The work apparatus of claim 2, wherein said brake arrangement is released when said actuation lever is in said second intermediate position (IIa).

6. The work apparatus of claim 1, wherein said further position (B) corresponds to a first end position (III) or a second end position (IIIa) of said actuation lever, in which said actuation lever is displaced from said first position (A) by a maximum positioning path.

7. The work apparatus of claim 1, wherein said first position (A) is an initial position (I) of said actuation lever.

8. The work apparatus of claim 1, wherein said control device, in response to said signal of said signal transmitter, initiates operation of said combustion engine only when a predetermined operating state of the work apparatus is detected.

9. The work apparatus of claim 8, wherein said predetermined operating state is a successful, completed first start of said combustion engine.

10. The work apparatus of claim 1 further comprising:
a locking device configured to electronically lock; and,
said signal of said signal transmitter being configured to release said locking device.

11. The work apparatus of claim 1 further comprising:
a throttle lever for said combustion engine;
a throttle lever lock associated with said throttle lever; and,
said control device being configured to initiate operation of said electric motor for starting said combustion engine when said throttle lever lock is pressed and said actuation lever is shifted to said further position (B).

12. The work apparatus of claim 1 further comprising:
a throttle lever for said combustion engine; and,
said control device being configured to initiate operation of said electric motor for starting said combustion engine when said throttle lever is pressed and said actuation lever is shifted to said further position (B).

* * * * *